(12) United States Patent
Beall et al.

(10) Patent No.: US 6,477,299 B1
(45) Date of Patent: Nov. 5, 2002

(54) ENVIRONMENTALLY STABLE ATHERMALIZES OPTICAL FIBER GRATING DEVICE AND METHOD OF MAKING A STABILIZED DEVICE

(75) Inventors: George H. Beall, Big Flats, NY (US); Joel P. Carberry, Horseheads, NY (US); Kenneth Chyung, Painted Post, NY (US); Joseph E. Pierson, Painted Post, NY (US); Kamjula P. Reddy, Corning, NY (US); James E. Webb, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/531,053

(22) Filed: Mar. 20, 2000

Related U.S. Application Data

(60) Provisional application No. 60/130,653, filed on Apr. 23, 1999.

(51) Int. Cl.[7] .................................................. G02B 6/34
(52) U.S. Cl. ........................... 385/37; 385/14; 385/123; 385/141
(58) Field of Search .............................. 385/14, 37, 42, 385/99, 123, 130, 141

(56) References Cited

U.S. PATENT DOCUMENTS

| | | | |
|---|---|---|---|
| 4,725,110 A | | 2/1988 | Glenn et al. |
| 5,042,898 A | | 8/1991 | Morey et al. |
| 5,426,714 A | * | 6/1995 | Gadkaree et al. .............. 385/39 |
| 5,694,503 A | * | 12/1997 | Fleming et al. ................ 385/37 |
| 5,721,802 A | * | 2/1998 | Francis et al. ............... 385/137 |
| 6,362,118 B1 | * | 3/2000 | Beall et al. .................... 501/7 |
| 6,055,348 A | * | 4/2000 | Jin et al. ....................... 385/37 |
| 6,087,280 A | * | 7/2000 | Beall et al. .................... 501/7 |
| 6,122,430 A | * | 9/2000 | Bookbinder et al. ......... 385/137 |
| 6,181,851 B1 | * | 1/2001 | Pan et al. ...................... 385/37 |
| 6,209,352 B1 | * | 4/2001 | Beall et al. .................. 65/30.1 |
| 6,243,527 B1 | * | 6/2001 | Dawson-Elli ................ 385/136 |

OTHER PUBLICATIONS

Yoffe, G.W. et al, "Temperature–Compensated Optical–Fiber Bragg Gratings", OFC'95 Technical Digest, papers W14.

"Generic Reliability Assurance Requirements for Fiber Optic Branching Components", Bellcore Technical Advisory TA–NWT–001221, issue 2, Nov. 1993.

"Generic Requirements for Fiber Optic Branching Components", Bellcore Technical Advisory TA–NWT 001209, issue 2, Dec. 1993.

* cited by examiner

*Primary Examiner*—Akm E. Ullah
*Assistant Examiner*—Jennifer Doan
(74) *Attorney, Agent, or Firm*—Svetlana Short

(57) ABSTRACT

The invention includes environmentally stable athermalized optical fiber gratings and methods of making such stabilized optical waveguide fiber grating. Stable humidity-resistant athermalized fiber Bragg gratings are provided by stabilizing a negative thermal expansion substrate and utilizing a durable frit to attach the fiber Bragg grating to the substrate.

58 Claims, 5 Drawing Sheets

ENVIRONMENTALLY STABLE ATHERMALIZES OPTICAL FIBER GRATING DEVICE AND METHOD OF MAKING A STABILIZED DEVICE

This application claims the benefit of U.S. Provisional Patent Application No. 60/130,653, filed Apr. 23, 1999.

BACKGROUND OF THE INVENTION

1. Field of the Invention

The present invention relates generally to optical waveguide devices, and particularly to optical waveguide devices that include negative thermal expansion substrates which athermalize an optical waveguide. The substrate is made from a material having a negative thermal expansion so that the substrate shrinks with a rise in temperature, which compensates for thermally varying optical properties of the optical waveguide device.

2. Technical Background

This invention relates to a temperature compensated, athermal optical device and, in particular, to an environmentally stabilized device with a stabilized negative expansion substrate for utilization in an optical fiber reflective Bragg grating optical waveguide device and to a method of stabilizing the optical waveguide device.

Index of refraction changes induced by UV light are useful in producing complex, narrow-band optical components such as filters and channel add/drop devices. These devices can be an important part of multiple-wavelength telecommunication systems. A popular photosensitive optical fiber device is a reflective grating (Bragg grating), which reflects light over a narrow wavelength band. Typically, these devices have channel spacings measured in nanometers.

There are already known various constructions of optical filters, among them such which utilize the Bragg effect for wavelength selective filtering. U.S. Pat. No. 4,725,110 discloses one method for constructing a filter which involves imprinting at least one periodic grating in the core of the optical fiber by exposing the core through the cladding to the interference pattern of two ultraviolet beams that are directed against the optical fiber at two angles relative to the fiber axis that complement each other to 180° C. This results in a reflective grating that is oriented normal to the fiber axis. The wavelength of the light reflected by such an optical fiber with the incorporated grating filter is related to the spacing of the grating which varies either with the strain to which the grating region is subjected, or with the temperature of the grating region, in a clearly defined relationship, which is substantially linear to either one of these parameters.

For a uniform grating with spacing L, in a fiber with an effective index of refraction n and expansion a, the variation of center reflective wavelength, $l_r$ is given by $$dl_r/dT = 2L[dn/dT + na]$$

In silica and germania-silica fiber reflective gratings the variation in center wavelength is dominated by the first term in the brackets, the change of index of refraction with temperature. The expansion term contributes less than ten percent of the total variability. The ratio $dl_r/dT$ is typically 0.01 nm°C. for a grating with a peak reflectance at 1550 nm.

One practical difficulty in the use of these gratings is their variation with temperature. In as much as the wavelength of the light reflected by the fiber grating varies with the temperature of the grating region this basic filter cannot be used in applications where the reflected light wavelength is to be independent of temperature. Methods of reliably and stably athermalizing the fiber reflective grating are needed to meet the rigorous and always growing optical telecommunications application demands and requirements for such gratings.

One method of athermalizing a fiber reflective grating is to thermally control the environment of the grating with an actively controlled thermal stabilization system. Such thermal stabilization is costly to implement and power, and its complexity leads to reliability concerns.

A second athermalization approach is to create a negative expansion that compensates the dn/dT. Devices which employ materials with dissimilar positive thermal expansions to achieve the required negative expansion are known.

U.S. Pat. No. 5,042,898 discloses a temperature compensated, embedded grating, optical waveguide light filtering device having an optical fiber grating. Each end of the fiber is attached to a different one of two compensating members made of materials with such coefficients of thermal expansion relative to one another and to that of the fiber material as to apply to the fiber longitudinal strains, the magnitude of which varies with temperature in such a manner that the changes in the longitudinal strains substantially compensate for these attributable to the changes in the temperature of the grating.

Yoffe, G. W. et al in "Temperature-Compensated Optical-Fiber Bragg Gratings" OFC95 Technical Digest, paper WI4, discloses a device with a mechanical arrangement of metals with dissimilar thermal expansions which causes the distance between the mounting points of an optical fiber to decrease as the temperature rises and reduce the strain in a grating.

Another method of athermalizing optical waveguide devices utilizes a substrate for attachment with the optical fiber grating with the substrate fabricated from a material with an intrinsic negative coefficient of expansion.

SUMMARY OF THE INVENTION

One aspect of the present invention is an environmentally stable athermalized optical fiber grating waveguide device for use in an optical waveguide deployment environment, which includes an optical fiber grating which reflects light centered about a wavelength λ, an environmentally stable (stabilization treated) negative thermal expansion beta-eucryptite glass-ceramic substrate with the fiber grating attached under tension to the substrate with an environmentally durable lead zinc boron glass frit fusion seal wherein the substrate compensates for thermally induced wavelength shifts in the fiber grating and the wavelength λ varies less than +/−0.015 nm when exposed to a humid environment.

According to an embodiment of the present invention an environmentally stable athermalized optical fiber Bragg grating waveguide filter device for use in an optical waveguide deployment environment, includes an optical fiber Bragg grating which reflects light centered about a wavelength λ, a stabilized treated environmentally stable negative thermal expansion microcracked beta-eucryptite glass-ceramic substrate, with the fiber grating being attached under tension to the substrate wherein the substrate compensates for thermally induced wavelength shifts in the fiber grating and the wavelength λ varies less than +/−0.015 nm when exposed to a humid environment.

According to one embodiment of the present invention a method of making an environmentally stable athermalized fiber grating waveguide device for use in an optical waveguide deployment environment, includes the steps of providing an optical fiber grating which operates on light centered about a wavelength λ, environmentally stabilizing a negative thermal expansion beta-eucryptite glass-ceramic substrate, attaching the optical fiber grating to the environmentally stabilized glass-ceramic substrate with a lead zinc borate glass frit fusion seal wherein the substrate athermalizes thermally induced wavelength shifts in the fiber grating and the wavelength λ varies less than +/−0.015 nm when exposed to a humid environment.

An embodiment of the present invention also includes a method of making an environmentally stable athermalized fiber grating waveguide device for use in an optical waveguide deployment environment. The method includes the steps of providing an optical fiber Bragg grating which reflects light centered about a wavelength λ, environmentally stabilizing a negative thermal expansion microcracked beta-eucryptite glass-ceramic substrate, attaching the optical fiber grating under tension to the environmentally stabilized glass-ceramic substrate wherein the substrate compensates for thermally induced wavelength shifts in the fiber grating and the center wavelength λ varies less than +/−0.010 nm when exposed to a humid environment which has a relative humidity of at least 80 %.

An embodiment of the invention also includes a method of making an environmentally stable athermalized fiber Bragg grating waveguide device for use in an optical waveguide deployment environment. The method includes the steps of providing an optical fiber Bragg grating which reflects light centered about a wavelength λ, providing a negative thermal expansion beta-eucryptite glass-ceramic substrate, attaching the optical fiber grating under tension to the glass-ceramic substrate with a lead zinc borate glass frit fusion seal at a temperature in the range from 410° C. to less than 430° C. wherein the substrate compensates for thermally induced wavelength shifts in the fiber grating and the wavelength λ varies less than +/−0.010 nm when exposed to a humid environment which has a relative humidity of at least 80 %

The inventive devices and methods provide a high degree of dimensional stability under the long-term exposures of humidity at various temperatures experienced with optical waveguide deployment environments.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying figures are included to provide a further understanding of the invention, and are incorporated in and constitute a part of this specification. The figures illustrate various embodiments of the invention, and together with the description serve to explain the principles and operation of the invention.

DETAILED DESCRIPTION OF THE PREFERRED EMBODIMENTS

Figure 1:
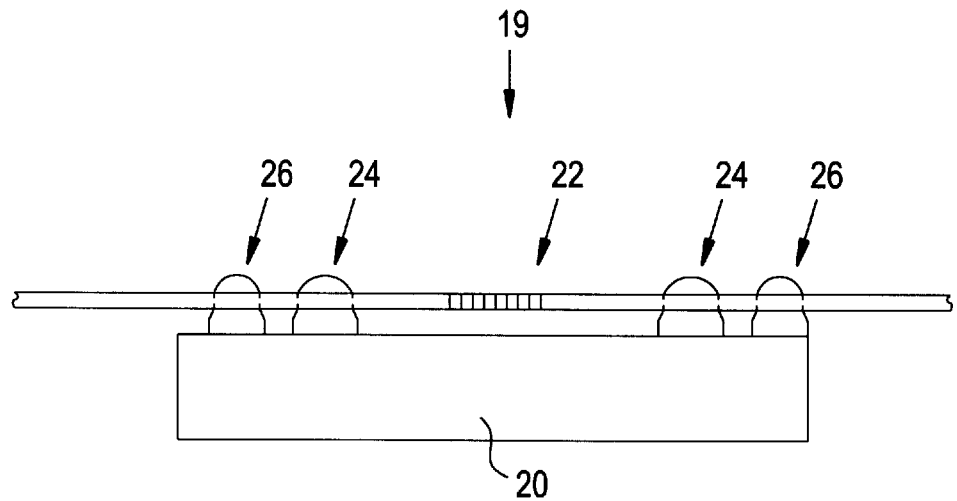
FIG. 1 is a side view of an optical waveguide device embodying the Invention.

Reference will now be made in detail to the present preferred embodiments of the invention, examples of which are illustrated in the accompanying drawings. An exemplary embodiment of the environmentally stable athermalized optical fiber grating of the present invention is shown in FIG. 1, and is designated generally throughout by reference numeral 19.

In accordance with the invention, the present invention for an environmentally stable athermalized optical fiber Bragg grating waveguide filter device for use in an optical waveguide deployment environment includes an optical fiber Bragg grating which operates on and reflects light centered about a wavelength λ. As shown in FIG. 1, in addition to optical fiber Bragg grating 22, athermalized optical fiber Bragg grating waveguide device 19 includes a stabilized treated environmentally stable negative thermal expansion beta-eucryptite glass-ceramic substrate 20. Fiber grating 22 is attached under tension to substrate 20 with environmentally durable lead zinc boron glass frit fusion seal 24 wherein substrate 20 compensates for thermally induced wavelength shifts in fiber grating 22 so that the wavelength λ varies less than +/−0.015 nm when exposed to a humid environment. Preferably fiber grating 22 is attached under tension with a first and second lead zinc boron glass frit fusion seal 24 to substrate 20. In addition securement members 26 are utilized to further secure the movement of fiber 22 relative to substrate 20 and glass frit fusion seals 24, preferably with securement members 26 being epoxy seals. Waveguide device 19 is assembled such that when the temperature of the device and its surroundings increases, substrate 20 shrinks and releases the tensions on fiber grating 22 to compensate for optical changes and wavelength variations caused by the increased temperature of optical waveguide fiber grating 22. In a preferred embodiment wavelength λ varies less than +/−0.010 nm when device 19 is exposed to a humid environment that has a relative humidity greater than 80%. Most preferably wavelength λ varies less than +/−0.010 nm when device 19 is exposed for 2000 hours to a humid environment that has a relative humidity of at least 85% and a temperature of at least 25° C. Optical waveguide device 19 provides improved performances when used in the inverted optical waveguide deployment environment with minimal variation of wavelength λ over its life span.

Stabilized treated environmentally stable negative thermal expansion beta-eucryptite glass-ceramic substrate 20 is a microcracked glass-ceramic body that has a plurality of driven microcracks with sealed microcrack crack tips. Glass-ceramic substrate 20 with driven microcracks and sealed microcrack crack tips is preferably a bathed humidified dried substrate. Bathed humidified dried substrate 20 is a substrate that has been submerged in a liquid bath that comprises water, then exposed to a humidity treatment atmosphere, and then a drying treatment atmosphere prior to attachment of fiber grating 22. Preferably substrate 22 is a microcracked body which has a dimensional length (particularly the length of substrate 20 in alignment with fiber grating 22) and a plurality of microcracks, with the microcracks having a stabilized crack length wherein the dimensional length of the substrate microcracked body is stable when exposed to the optical waveguide deployment environment. With such a substrate the dimensional length of the substrate microcracked body preferably changes less than 32 ppm when exposed to the optical waveguide deployment environment. Preferably the substrate microcracked body has a plurality of microcracks terminating with crack tips with the crack tips sealed and substantially filled with a precipitant of glass-ceramic constituents leached from the glass-ceramic substrate body. With such sealed and filled tips the substrate 20 preferably has changes in dimension delta D≦20 ppm when exposed to the optical waveguide deployment environment and its humidity.

Environmentally durable frit fusion seals 24 are lead zinc borate glass frit fusion seals that are filled with a phase inverting mill addition, such as a pyrophosphate mill addition. Preferably fiber grating 22 is attached under tension to substrate 20 with glass frit fusion seal 24 at a frit bonding temperature in the ranges from 405° C. to 440° C. Preferably fusion seal 24 has a frit bonding sealing temperature in the range from 410° C. to less than 430° C., most preferably from 420° C. to less than 430° C. Such lead zinc borate glass frit fusion seals 24 preferably form a bond with fiber grating 22 which has a pull strength of at least 2 lb., and preferably greater than 3 lb.

Figure 2:
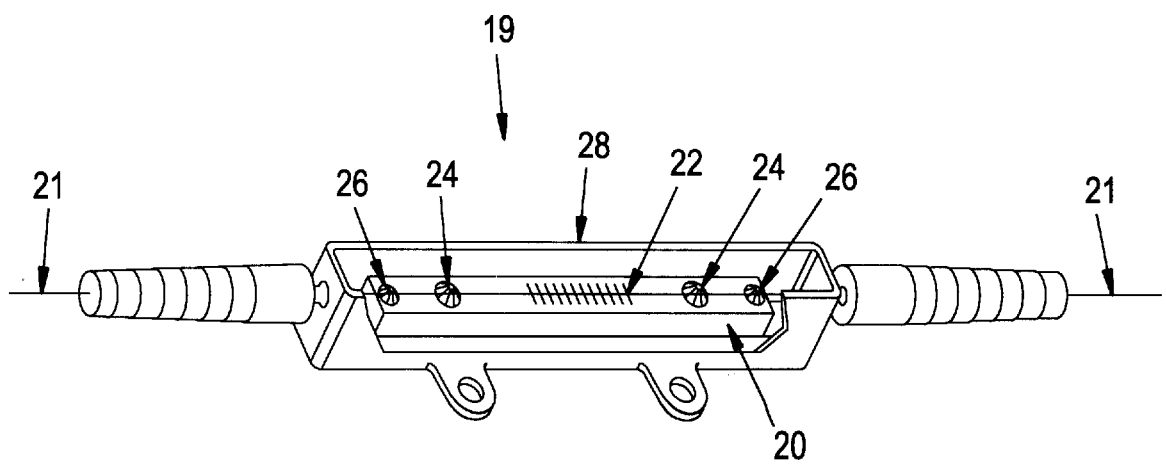
FIG. 2 is a prospective and partial cut-away view of an optical waveguide device embodying the Invention.

As shown in FIG. 2, athermalized optical fiber Bragg grating waveguide device 19 includes a packaging container 28. To better illustrate device 19, in FIG. 2 the top cover of container 28 is not in place and the front side wall has been cut away. The refractive index grating in fiber Bragg grating 22 is depicted by the perpendicular lines that extend beyond the fiber and its core. Fiber Bragg grating 22 is contained within container 28 with fiber ends 21 of fiber grating 22 extending through the end walls of container 28 so they can be connected with optical fibers of an optical fiber system. In a preferred embodiment container 28 containing fiber grating 22 athermalized with substrate 20 is a non-hermetic packaging container. The preferred non-hermetic packaging container is VECTRA® liquid crystal polymer container. Such packaging of device 19 is non-hermetic in that humidity ($H_2O$ molecules) from outside of closed container 28 can enter into the interior of container 28 and come into contact with fiber grating 22, substrate 20, and frit fusion seals 24 and the other contents in the package. In a alternative embodiment container 28 is a hermetic packaging container, such that the fiber grating, substrate and frit seal are hermetically contained and sealed within container 28 and $H_2O$ molecules and other gases are inhibited from entering the container from the outside. Such a hermetic container is a gold covered KOVAR® container. Reference is made to PCT/US 98/20042 (Bookbinder 10)(U.S. Prov. No. 60/061,688-filed Oct. 10, 1997) which is incorporated herein by reference as though fully set forth in its entirety for a more detailed explanation of container 28 and the packaging of fiber grating 22, substrate 20, and frit fusion seals 24 within such a housing container and isolation from the housing container.

The invention includes a method of making an environmentally stable athermalized fiber grating waveguide device for use in an optical waveguide deployment environment, with the method including the steps of providing an optical fiber grating which operates on light centered about a wavelength λ and environmentally stabilizing a negative thermal expansion beta-eucryptite glass-ceramic substrate. The method includes attaching optical fiber grating 22 under tension to environmentally stabilized glass-ceramic substrate 20 with a environmentally durable lead zinc borate glass frit fusion seal wherein substrate 20 compensates for thermally induced wavelength shifts in fiber grating 22 and wavelength λ varies less than +/−0.015 nm when exposed to a humid environment.

Environmentally stabilizing substrate 20 includes providing a dimensionally unstable substrate, submerging the substrate in a liquid bath containing water, then exposing the substrate to a humid treatment atmosphere and then drying the exposed substrate. Environmentally stabilizing substrate 20 includes providing a dimensionally unstable microcracked substrate having microcracks with lengths and crack tips, driving these microcracks to increase their lengths, and then sealing the microcrack crack tips. Preferably such exposing and sealing includes exposing the substrate to a humid atmosphere having a relative humidity of at least 80 % In a preferred embodiment environmentally stabilizing includes boiling the provided substrate for at least 3 hours in deionized water, drying at 200° C. for at least 12 hours in a drying atmosphere (low, near zero humidity air), then exposing the substrate for at least 5 days to a damp heat atmosphere (≧80° C./≧80% relative humidity), then dried for at least 12 hours in a drying atmosphere at 100° C. An alternative embodiment of environmentally stabilizing comprises using a liquid bath containing water at a temperature below 50° C. to drive the microcracks prior to sealing crack tips with a humidity treatment. Reference is made to concurrently filed U.S Patent Application Provisional No. 60/130,896, filed Apr. 23, 1999, METHOD OF MAKING STABILIZED NEGATIVE THERMAL EXPANSION OPTICAL WAVEGUIDE SUBSTRATE AND A GLASS-CERAMIC SUBSTRATE, by Webb et al. which is incorporated herein by references as though fully set forth in its entirety for a more detailed explanation of stabilizing and stabilized substrates 20.

Attaching fiber Bragg grating 22 to substrate 20 includes processing lead zinc borate glass frit fusion seals 24 at a temperature in the range from 405° C. to 440° C. Preferably such processing of seals 24 includes heating the glass frit fusion seal to a temperature in the range from 410° C. to less than 430° C., and more preferably 420° C. to less than 430° C., and most preferably at a temperature of about 425° C. Such heat processing preferably results in forming a glass frit fusion seal to fiber grating bond that has a pull strength greater than 2 lb, preferably ≧3 lb.

The method preferably includes enclosing attached fiber grating 22, substrate 20, and glass frit fusion seals 24 in a non-hermetic packaging container 28, in which humidity can enter into the enclosed container from outside of the container. In an additional embodiment, the method includes hermetically sealing attached fiber grating 22, substrate 20, and glass frit fusion seals 24 within a hermetic packaging container 28.

The invention includes an environmentally stable athermalized optical fiber Bragg grating waveguide filter device for use in an optical waveguide telecommunications deployment environment, that includes an optical fiber Bragg grating which reflects light centered about a wavelength λ, and a stabilized treated environmentally stable negative thermal expansion microcracked beta-eucryptite glass-ceramic substrate. Fiber Bragg grating 22 is attached under tension to substrate 20 wherein substrate 20 compensates for thermally induced wavelength shifts in fiber grating 22 and wavelength λ varies less than +/−0.04 nm, preferably less than +/−0.03 nm, preferably less than +/−0.02, and more preferably less than +/−0.015 nm when exposed to a humid environment. In a preferred environment wavelength λ varies less than +/−0.010 nm when exposed to a humid environment having a relative humidity of at least 80%, and most preferably varies less than +/−0.010 nm when exposed for 2000 hours to a humid environment with a temperature of 25° C. and a relative humidity of at least about 85%.

Environmentally stable substrate 20 preferably has driven microcracks that end with sealed crack tips. Preferably such a substrate has been submerged in a water bath (liquid that contains water), exposed to a humidity treatment atmosphere, and a drying treatment atmosphere prior to the attachment of grating 22. Such a stable substrate 20 is a water submerged, humidified and dried substrate. Preferably substrate 22 is a microcracked body with a dimensional length between fiber grating attachment points, and has microcracks with stable crack lengths such that the substrate body dimensional length is stable and does not substantially change when exposed to the optical waveguide telecommunications deployment environment. Preferably the substrate dimensional length changes less than 50 ppm, preferably less than 40 ppm, more preferably less than about 32 ppm when exposed to the deployment environment. In a preferred embodiment the length change is less than 20 ppm.

Preferably substrate 20's microcracks. terminate with crack tips that are substantially filled with a dried film precipitant of glass-ceramic constituents leached from the substrate body. Preferably the substrate 20 body has a change in dimension less than 32 ppm when exposed to the deployment environment. In a preferred embodiment the device includes a non-hermetic packaging container 28 which contains the fiber grating attached to the substrate. In an alternative embodiment the device includes a hermetic packaging container 28 with substrate 20 and fiber grating 22 therein such that exposure to contaminants outside of the package is minimized.

The invention further includes the method of making an environmentally stable athermalized fiber grating waveguide device which includes the steps of providing an optical Bragg grating 22 which reflects light centered about a wavelength λ, and environmentally stabilizing negative thermal expansion microcracked beta-eucryptite glass-ceramic substrate 20. The method further includes attaching fiber grating 22 to environmentally stabilized glass-ceramic substrate 20 wherein substrate 20 compensates for thermally induced wavelength shifts in the fiber grating and the wavelength λ varies less than +/−0.020 nm, preferably less than +/−0.010 nm, when exposed to a humid environment with at least 80 % relative humidity. Environmentally stabilizing substrate 20 includes providing a dimensionally unstable substrate, submerging the provided substrate in a bath containing water, exposing the submerged substrate to a humid treatment atmosphere, and drying the exposed substrate prior to attaching.

Environmentally stabilizing the substrate includes providing a dimensionally unstable microcracked substrate with microcracks having lengths and crack tips. The microcracks are driven to increase their lengths to provide a desired target coefficient of thermal expansion and the crack tips are sealed through preconditioning treatments. Preferably this includes exposing a previously submerged substrate to a humid atmosphere with a temperature of at least 80° C. and a relative humidity of at least 80% for a sufficiently long period of time and then dried.

Preferably the method further includes enclosing the attached fiber grating 22 and substrate 20 in a non-hermetic packaging container 28. Alternatively the method includes hermetically sealing the attached fiber grating and substrate within a hermetic packaging container 28.

Preferably the invention includes exposing the fiber grating attached to the substrate for at least 2000 hours to humid environment of at least 85% relative humidity at a temperature of about 25° C. and monitoring the center wavelength λ. Such exposure and testing ensures the reliability of a representative device 19 in extreme deployment environments.

Figure 3:
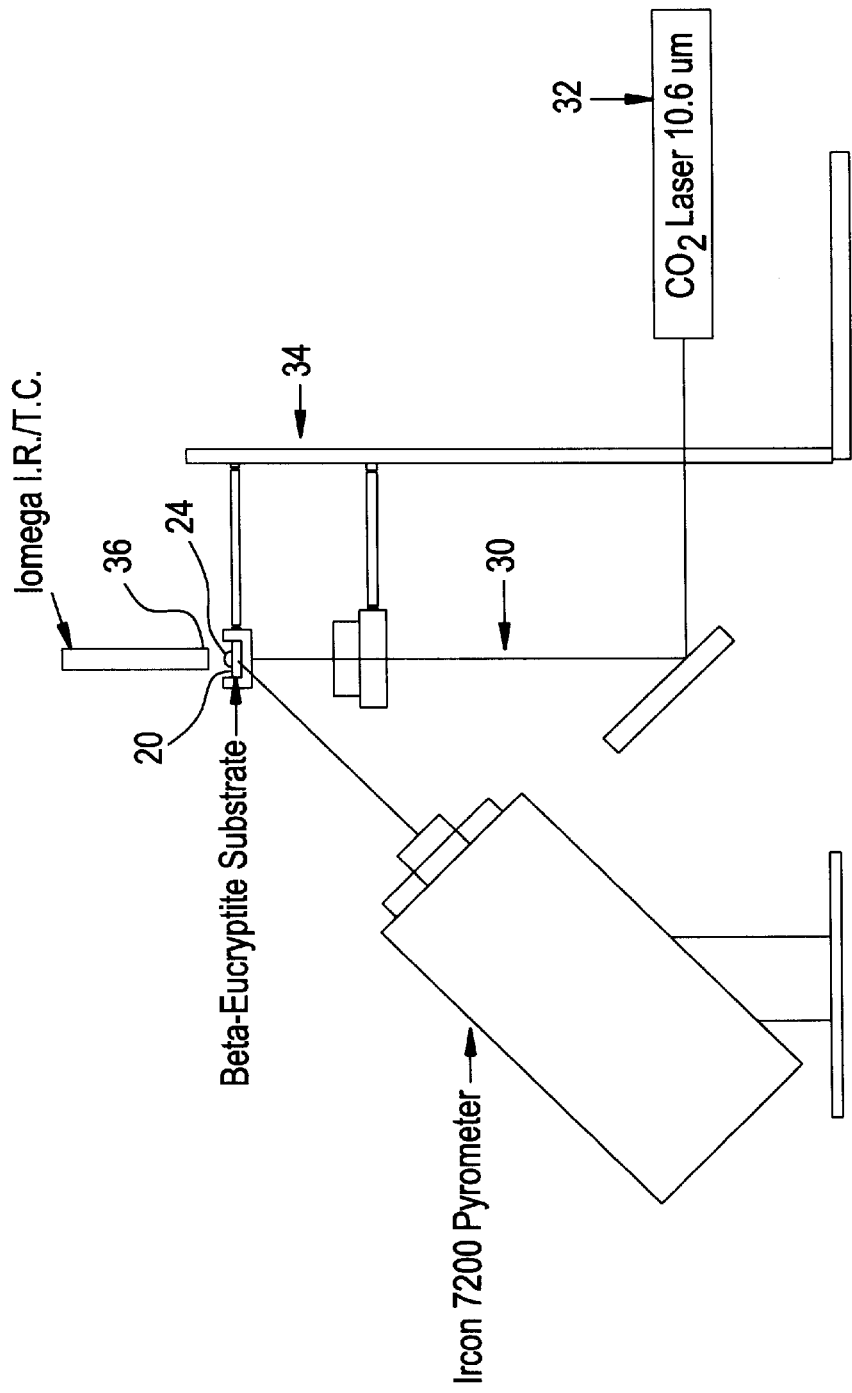
FIG. 3 is a side schematic view of an apparatus and method embodying the Invention.

The invention further includes a method of making an environmentally stable athermalized fiber Bragg grating waveguide device for an optical telecommunications deployment environment which includes providing an optical fiber Bragg grating which reflects light centered about a wavelength λ and providing a negative thermal expansion beta-eucryptite glass-ceramic substrate. The method further includes attaching a fiber grating 22 under tension to substrate 20 with a lead zinc borate glass frit fusion seal at a temperature in the range from 410° C. to less than 430° C. wherein substrate 20 compensates for thermally induced wavelength shifts in the fiber grating and wavelength λ varies less than +/−0.01 nm when exposed to a humid environment which has a relative humidity of at least 80%. Preferably attaching fiber grating 22 to substrate 20 includes heating lead zinc borate glass frit fusion seal to a temperature of about 425° C., and within the range of 422° C. to 428° C. Preferably substrate 20 is an environmentally stabilized substrate. As shown in FIG. 3, attaching with lead zinc borate glass frit fusion seal 24 preferably includes heating seal 24 with a laser beam 30 through substrate 20. Preferably attaching includes heating with laser beam 30 and monitoring the temperature of heated glass frit fusion seal 24 with an infrared (IR) thermocouple 36. As shown in FIG. 3, $CO_2$ laser 32 produces laser beam 30 which has a wavelength of 10.6 microns. Holder 34 holds a lens system below substrate 20 and holds substrate 20. In addition to using a pyrometer from below, it is preferred to monitor the temperature of fusion seal 24 with an infrared thermocouple (for example OMEGA brand temperature sensor OS36-2 stainless steel housed, self-powered non-contact Infrared Thermocouple). This monitoring allows for precise control of the temperature of fusion seal 24 and allows for the formation of beneficial frit fusion seals. Preferably attaching includes forming a glass frit fusion seal to fiber grating board that has a pull strength in the range from 1 to 3 lb.

The method further includes enclosing attached fiber grating 22, substrate 20, and glass frit fusion seals 24 in a non-hermetic package container 28. Alternatively such is hermetically sealed within a hermetic packaging container.

EXAMPLES

The invention will be further clarified by the following examples which are intended to be exemplary of the invention.

These examples show the achievement of a non-hermetic packaged athermalized fiber Bragg grating device 19 that has a center wavelength stability of less than +/−0.01 nm after 2000 hours of exposure in damp heat and humid conditions. These fiber Bragg grating devices were achieved utilizing environmentally stable substrates 20 and a durable frit 24. In addition to submersion in boiling water, substrates 20 were exposed to damp heat of 85° C./85% relative humidity, and then drying at 100° C. overnight. The durable lead zinc borate glass frit fusion seals ($PbO-ZnO-B_2O_3$) (PZB) were filled with phase-inverting $(Mg,Co)_2 P_2O_7$.

Beta-eucryptite glass-ceramic specimens were made from a glass composition of 48.7 wt. % $SiO_2$, 37.8 wt. % $Al_2O_3$, 9.7 wt. % $Li_2O$, and 3.8 wt. % $TiO_2$ 8.5 wt. % $Al_2TiO_5$, from which beta-eucryptite specimens were made in accordance with U.S. patent application Ser. No. 08/785,336 filed on Jan. 16, 1997 (ATHERMAL OPTICAL DEVICE) which is incorporated herein by reference as though fully set forth in its entirety for a more detailed explanation of the making of unstabilized beta-eucryptite glass-ceramic substrates.

A lead zinc borate CRT sealing frit from the PZB class was chosen. Corning, Incorporated, Corning Code 7580 PZB CRT sealing frit with a base glass composition of 74.7 wt. % PbO, 12.9 wt. % ZnO, 8.3 wt. % $B_2O_3$, 1.9 wt. % BaO, 2.2 wt. % $SiO_2$ was utilized. Such a frit is an environmentally durable frit, in that the PZB base glass frit has an aqueous durability (% wt. change in 90° C. D.I. water/24 hours) of +0.006.

Frit

A. A frit processing matrix experiment was set up as follows, using five replicates (5 samples) of attached fiber gratings with the PZB-base frit over the temperature range of 385–460° C.

| Process T°C+ | 385° | 410° | 435° | 460° |
|---|---|---|---|---|
| Quantity of PZB Samples | 5 | 5 | 5 | 5 |

After attachment, these frit bonds were pull tested for strength evaluation, and frit bonds were selected for SEM examination after the pull test failures.

From these evaluations, the best frit and processing conditions(s) with better than 2 lbs pull test strength without fiber breakage were selected and used to fabricate fully functional VECTRA packaged devices.

To the PZB durable frit code 7580 were added phase inverting pyrophosphate mill additions, particularly:

PZB; Code 7580+10% wt. $(Co,Mg)_2P_2O_7$+5% wt. $Co_2P_2O_5$

Table 1 below shows the results of the fiber pull strength as a function of frit bonding temperature as measured by the IR thermocouple during the fit processing as shown in FIG. 3.

Using the PZB frit, the pull strengths of the (frit 24+epoxy 26) bonds processed at 410° C. and 435° C. are all consistently high in the range of 3.4–4.0 lbs, of which 1.5–2.0 (1.75) lbs are thought to be contribution by the outer epoxy bond, and the reflectance measurements (50.0 dB or less) indicates no fiber breakage. However, the frit processing temperature of 460° C. showed relatively high but erratic pull strengths, but the reflectance measurements of −15 to −20 dB indicate the fiber breakage, implying the frit bonding temperature of 460° C. may be too high. The preferred frit processing temperatures are in the range of 410° C. and less than 430° C. When the frit bonds were made at 380° C. or below, the frit did not flow adequately and the fibers pulled out without breakage at very low pull strength of less than 0.5 lb. From these results, the frit bonding temperature of 425° C. is selected as the optimum. In the following table calculated frit pull strength was determined by deducting 1.75 lbs. From the total to remove the epoxy bond strength contribution.

TABLE 1

Fiber pull strengths vs. the frit processing temperatures

| I.R./T.C (T°C) | Total Pull Strength (lbs) | Reflectance Input (dB) | (1542 nm) Output (dB) | Fiber Breakage | Calculated Frit Pull Strength (lbs) |
|---|---|---|---|---|---|
| 410 | 3.78 | −66.97 | −67.17 | Not broken | 2.03 |
| 435 | 3.96 | −67.76 | −66.57 | Not broken | 2.21 |
| 435 | 3.42 | −65.72 | −65.54 | Not broken | 1.67 |
| 460 | 2.48 | −17.02 | −17.65 | Not broken | 0.73 |

Figure 4:
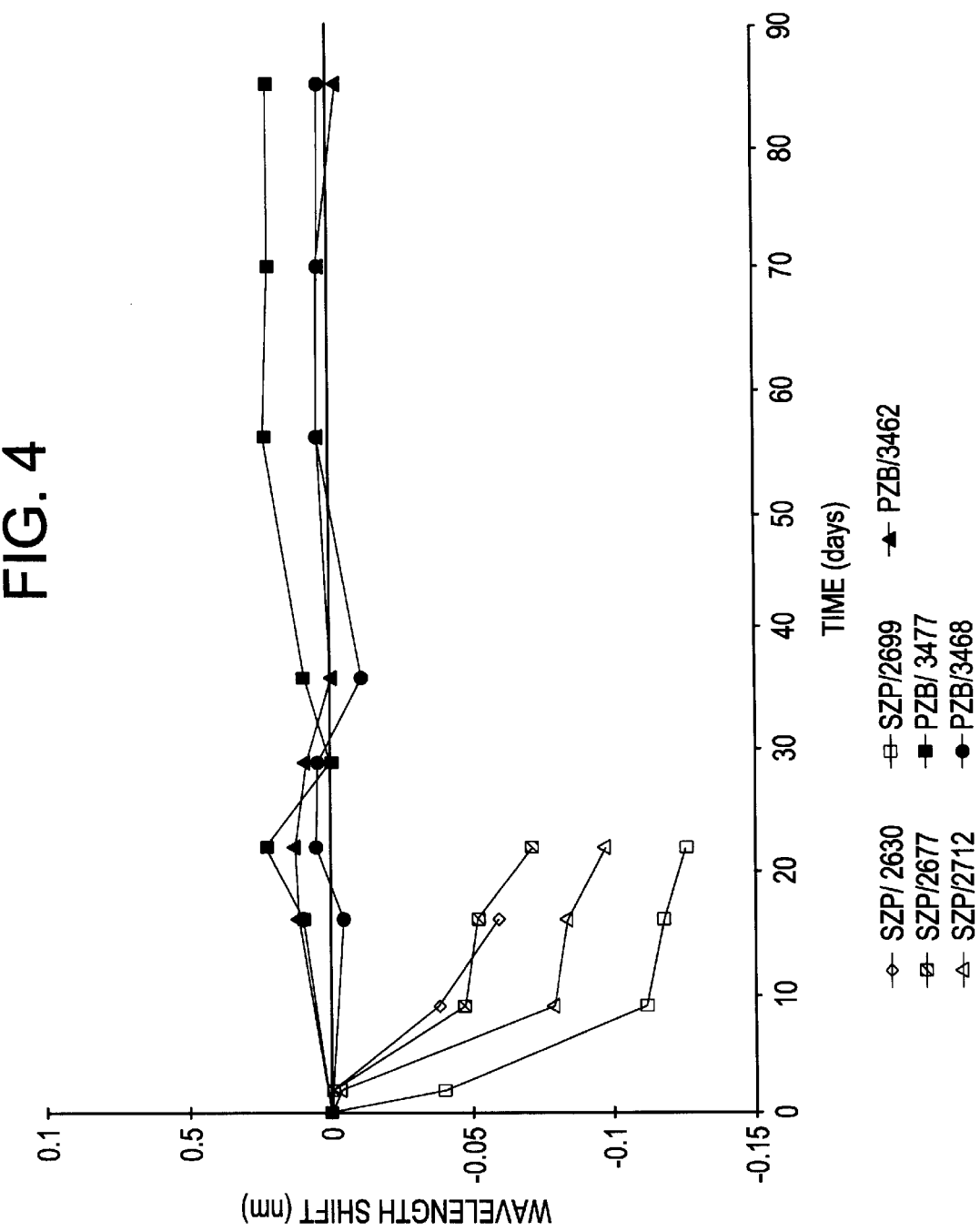
FIG. 4 is a plot of Wavelength Shift (nm) (y-axis) versus Time (days) (X-axis) comparing frit exposure durability.

FIG. 4 shows the difference between durable glass frit fusion seals and non-durable glass frit fusion seals. PZB (lead zinc borate) durable glass frits out performed and are durable to the compared tin zinc phosphorus (SZP) glass frit fusion seals. Fiber Bragg gratings were attached with these frits to un-treated unstable beta-eucryptite substrates and the wavelength monitored during exposure to damp heat (85° C./85R.H.); the durable frit is preferably durable in terms as having an aqueous durability (% wt. Change in 90° D.I. $H_2O$/24 hours) of less than =/−0.010, preferably less than or equal to about +/−0.006 . Comparatively the unstable frit of SZP has an aqueous durability of about −0.030. FIG. 4 shows that the durable frit helps to minimize wavelength shifts.

Figure 5:
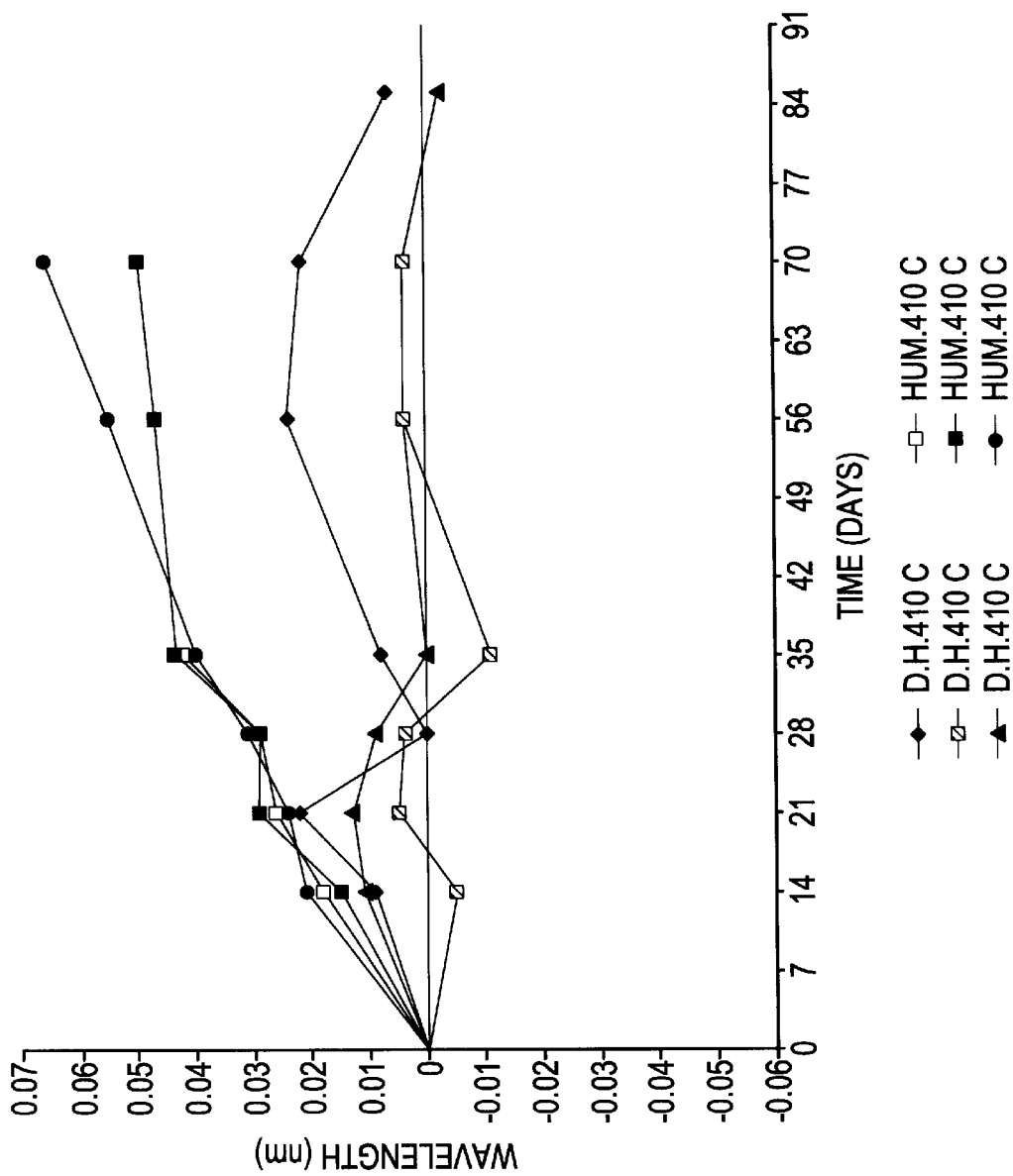
FIG. 5 is a plot of Wavelength Shift (nm) (y-axis) versus Time (days) (X-axis) comparing frit durability.

FIG. 5 shows the benefits of a durable frit and the different results of exposure to damp heat compared to humidor. Fiber Bragg gratings were attached with the durable PZB to untreated unstable beta-eucryptite. The unstable substrate leads to very large scale change of center wavelength $\lambda$. The frits are durable in terms minimizing their contribution to the center wavelength and maintaining the integrity of the fiber-frit bond-substrate attachment connection. FIGS. 4 and 5 show that durability and environmentally resistant (aqueous durability) of the attachment plays a role in achieving low $\lambda$ variations.

Substrates

2×4×50 mm substrates made with a 1300° C.—16 h ceram and thermal cycling twice to 800° C., were boiled in DI water—4 h/dried 200° C.—16 h, followed by a preconditioning treatment of 1 week in damp heat (85° C./85% r.h.) and dried 100° C.—16 h, and then used for the environmental stability durability testing.

Fiber Gratings

Coating striped high delta fiber with 5 mm long Bragg gratings with 20 ps dispersion, annealed at 125° C.—24 h were used.

Device

Fiber Gratings 22 were attached under tension to substrate 20 with the PZB-1 frit seals 24 at 425° C. The grating, substrate, and frit attachment was packaged in VECTRA Containers using:

MCA 95 UV cure epoxy (containing Polyset Company brand Siloxy PC-1000, Union Carbide Chemical & Plastics Company brands ERL-4221, ERL-4206, Cyracure UVI-6974, and A-187 Silane, Shell Oil Company brand Epon Resin 828, Cabot Corporation brand Cab-O-Sil 610, Geltech Inc. brand silaned GelTech 1.5 micro, and Corning, Inc. brand N118?TCE and N118/SIK) for outer relief bond, of epoxy securement members 26

2 part 6679 Fluorogel two part curing dielectric gel for covering top of device (fiber grating 22) from member 26 to 26 in that fiber is bare (coating stripped)

395 UV cure epoxy to fix the fiber to the boots seals fiber through hole of container ends and secure boots to container ends.

S-2000 Poron® silicone (Rogers Corporation) foam pad (2½"×5/32"×1/32") between substrate bottom and bottom of container, with securement holes for the 3145 silicone (for bonding substrates to the VECTRA package) (as per previous referenced PCT/US 98/20042 (Bookbinder 10) (U.S. Prov. No. 60/061, 688).

Two sets of (6) VECTRA packaged were exposed in humidor (25° C./100% relative humidity) and damp heat (DH, 85° C./85%), respectively. The following evaluations were made:

Center Wavelength Stability

The changes in the center wavelength ($\Delta\lambda_c$) were monitored as a function of time up to 12 weeks (2000 hrs).

Figure 6:
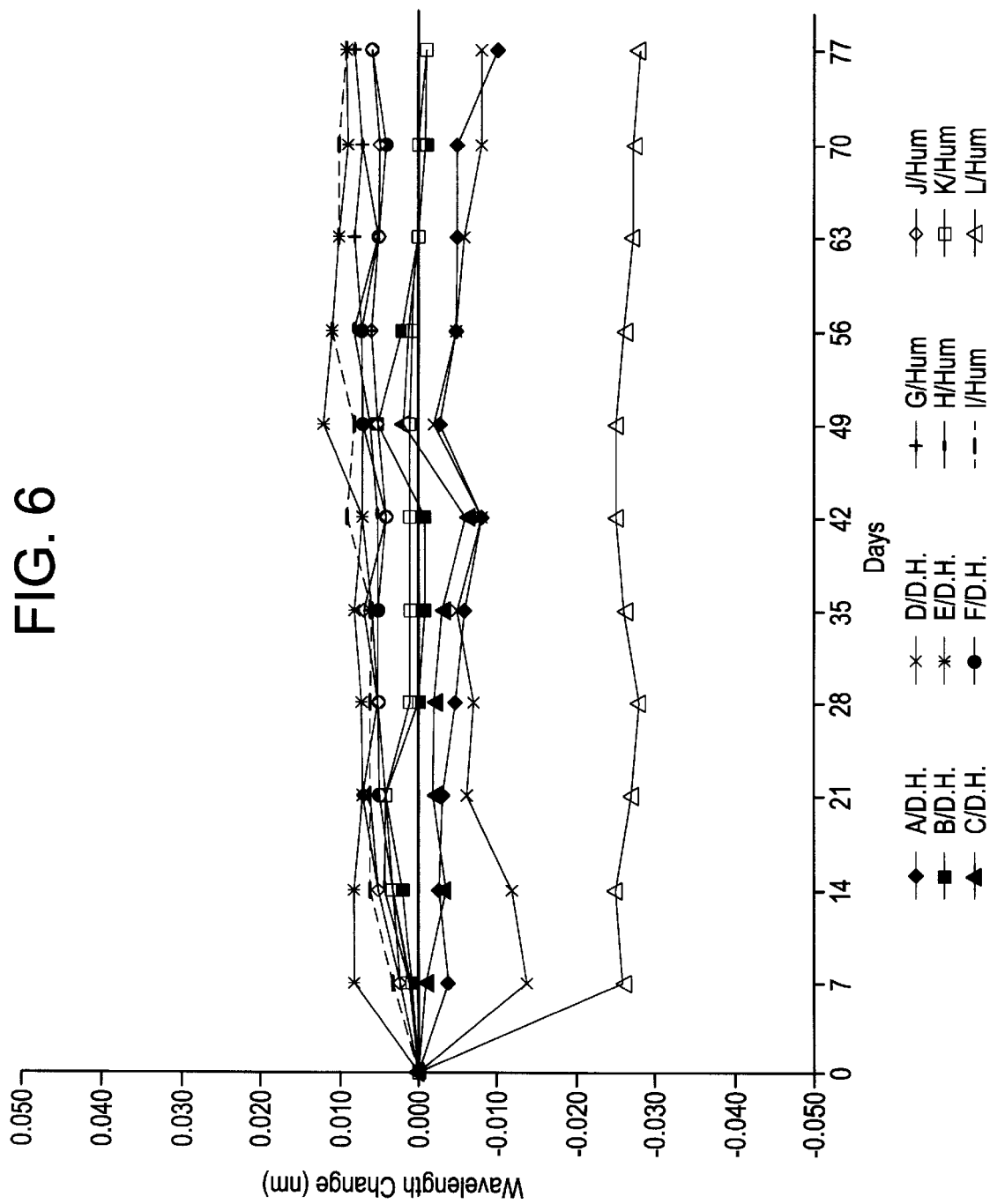
FIG. 6 is a plot of Wavelength Change (nm) (y-axis) versus Time in Days (x-axis) of fiber Bragg grating devices in accordance with the Invention with the devices including a VECTRA packaging container and exposed to humidor (Hum) or damp heat (D.H.) for 12 weeks.

FIG. 6 shows the center wavelength changes ($\Delta\lambda_c$) of the 12 VECTRA packaged devices 19 as a function of humidity exposure time; six (6) devices were exposed in damp heat (DH) and six devices to humidor (HUM), It can be seen that 11 out of 12 devices, the $\Delta\lambda_c$ remained within +/−0.01 nm even after 12 weeks, with the exception of the one device with less than −0.03 nm in HUM.

From FIG. 6 it is evident that the additional preconditioning treatment of one week in DH has achieved the substrate dimensional stability in the difficult to achieve humidor (25° C., 100% humidity), as demonstrated by the $\Delta\lambda_c$ stability even after 12 week exposure both in DH as well as HUM.

FIG. 6 shows that $\lambda$ varies a minimal amount when exposed to the humidity environments of damp heat (85° C./85 R.H.) and humidor (25° C./100% R.H.). The invention achieves high stability with the stabilized beta-eucryptite glass-ceramic substrate and the durable lead zinc borate frit. All 12 sample devices provide wavelength $\lambda$ variations less than +/−0.030 nm. The devices also provide variations less than +/−0.020 nm, less than +/−0.015 nm, and even less than +/−0.010 nm, over periods of time of about 2000 hours. This clearly demonstrates environmentally stable non-hermetic packaging capability of fiber Bragg grating.

Such experiment shows that the invention provides a beneficial environmentally robust wavelength stability with wavelength $\lambda$ varying less than +/−0.020 nm, less than +/−0.015 nm, and less than or equal to +/−0.010 nm when exposed to extreme deployment environments which may include high humidity.

It will be apparent to those skilled in the art that various modifications and variations can be made to the present invention without departing from scope of the invention. Thus, it is intended that the preset invention cover the modifications and variations of this invention provided they come within the scope of the appended claims and their equivalents.

What is claimed is:

1. An environmentally stable athermalized optical fiber grating waveguide device for use in an optical waveguide deployment environment, said device comprising: an optical fiber grating which reflects light centered about a wavelength $\lambda$, a stabilized treated environmentally stable negative thermal expansion β-eucryptite glass glass ceramic substrate, said substrate being a bath humidified dried substrate, said fiber grating being attached under tension to said substrate with an environmentally durable frit fusion seal wherein the substrate compensates for thermally induced wavelength shifts in said fiber grating and a said wavelength $\lambda$ varies less that +/−0.04 nm when exposed to a humid environment.

2. A device as claimed in claim 1, wherein said environmentally durable frit fusion seal is a lead zinc borate glass frit fusion seal.

3. A device as claimed in claim 2, wherein said lead zinc borate glass frit fusion seal is filled with a phase inverting mill addition.

4. A device as claimed in claim 2, wherein said lead zinc borate glass frit fusion seal is filled with a pyrophosphate mill addition.

5. A device as claimed in claim 2, wherein the fiber grating is attached under tension to said substrate with said glass frit fusion seal at a frit bonding temperature in the range from 405° C. to 440° C.

6. A device as claimed in claim 2, wherein the fiber grating is attached under tension to said substrate with said glass frit fusion seal at a frit bonding temperature in the range of 410° C. to less than 430° C.

7. A device as claimed in claim 2, wherein the fiber grating is attached under tension to said substrate with said glass frit fusion seal at a frit bonding temperature in the range from 420° C. to less than 430° C.

8. A device as claimed in claim 2, wherein said glass frit fusion seal forms a bond with said fiber grating which has a pull strength greater than 1 lb.

9. A device as claimed in claim 2, wherein said glass frit fusion seal forms a bond with said fiber grating which has a pull strength in the range of 1–3 lbs.

10. A device as claimed in claim 1, wherein said wavelength $\lambda$ varies less than +/−0.030 nm, when exposed to humidity.

11. A device as claimed in claim 1, wherein said wavelength $\lambda$ varies less than +/−0.020 nm, when exposed to humidity.

12. A device as claimed in claim 1, wherein said wavelength $\lambda$ varies less than +/−0.015 nm, when exposed to humidity.

13. A device as claimed in claim 12, wherein said wavelength $\lambda$ varies less than +/−0.010 nm and said humid environment has a relative humidity of at least about 80 %.

14. A device as claimed in claim 12, wherein said wavelength $\lambda$ varies less than +/−0.010 nm when exposed for 2000 hours to said humid environment and said humid environment has a relative humidity of at least about 85% and a temperature of about 25° C.

15. A device as claimed in claim 12, wherein said substrate is further comprised of a plurality of driven microcracks that include sealed crack tips.

16. A device as claimed in claim 15 wherein said substrate has been submerged in a water bath and exposed to a humidity treatment atmosphere prior to attachment of said grating to said substrate.

17. A device as claimed in claim 1, wherein said wavelength $\lambda$ varies less than +/−0.010 nm and said humid environment has a relative humidity of at least about 80%.

18. A device as claimed in claim 1, wherein said wavelength $\lambda$ varies less than +/−0.020 nm when exposed for 2000 hours to said humid environment and said humid environment has a relative humidity of at least about 85% and a temperature of about 25° C.

19. A device as claimed in claim 1, wherein said substrate is further comprised of a plurality of driven microcracks that include sealed crack tips.

20. A device as claimed in claim 19 wherein said substrate is a preconditioned water bathed humidified dried substrate.

21. A device as claimed in claim 1 wherein said substrate is a microcracked body having a dimensional length and a plurality of microcracks, said microcracks having a stabilized crack length wherein said dimensional length of said substrate microcracked body is dimensionally stabilize when exposed to the optical waveguide deployment environment.

22. A device as claimed in claim 21, wherein the dimensional length of said substrate microcracked body changes less than 50 ppm when exposed to the optical waveguide deployment environment.

23. A device as claimed in claim 22, wherein said length changes less than 40 ppm.

24. A device as claimed in claim 22, wherein said length changes less than 32 ppm.

25. A device as claimed in claim 1 wherein said substrate is a microcracked body having a plurality of microcracks terminating with a crack tip and said microcrack tips are substantially filled with leached glass-ceramic constituents.

26. A device as claimed in claim 25 wherein said substrate body has a change in dimensions less than or equal to 20 ppm when exposed to the optical waveguide deployment environment.

27. A device as claimed in claim 1, said device further comprising a nonhermetic packaging container, said fiber grating attached to said substrate contained within said nonhermetic packaging container.

28. A device as claimed in claim 1, said device further comprising a hermetic packaging container, said fiber grating attached to said substrate contained within said hermetic packaging container.

29. A device as claimed in claim 1 wherein said substrate is a microcracked body having a plurality of microcracks terminating with a crack tip and said microcrack tips are substantially filled with a precipitant of glass-ceramic constituents leached from said glass-ceramic substrate body.

30. A device as claimed in claim 29 wherein said substrate body has a change in dimension less than 32 ppm when exposed to the optical waveguide deployment environment.

31. A device as claimed in claim 1 said device further comprising a nonhermetic packaging container, said fiber grating attached to said substrate contained within said nonhennetic packaging container.

32. A device as claimed in claim 1, said device further comprising a hermetic packaging container, said fiber grating attached to said substrate contained within said hermetic packaging container.

33. A method of making an environmentally stable athermalized fiber grating waveguide device for use in an optical waveguide deployment environment, said method comprising: providing an optical fiber grating which operates on light centered about a wavelength $\lambda$, environmentally stabilizing through $H_2O$ treatment a negative thermal expansion βeta-eucryptite glass-ceramic substrate, attaching said optical fiber grating under tension to said environmentally stabilized glass-ceramic substrate with an environmentally durable lead zinc borate glass frit fusion seal wherein said substrate compensates for thermally induced wavelength shifts in said fiber grating and said wavelength $\lambda$ varies less than +/−0.020 nm when exposed to a humid environment.

34. A method as claimed in claim 33, wherein environmentally stabilizing said substrate comprises providing a dimensionally unstable substrate, submerging the provided substrate in a bath containing water, exposing said submerged substrate to a humid treatment atmosphere, and drying said exposed substrate.

35. A method as claimed in claim 34, wherein exposing said submerged substrate to a humid treatment atmosphere comprises exposing said substrate to a humid atmosphere having a relative humidity of at least 80%.

36. A method as claimed in claim 33, wherein environmentally stabilizing said substrate comprises providing a dimensionally unstable microcracked substrate having a plurality of microcracks having lengths and crack tips, driving said microcracks so as to increase the length of said microcracks, and sealing the crack tips of said microcracks.

37. A method as claimed in claim 33, wherein attaching said fiber grating to said substrate with a lead zinc borate glass frit fusion seal includes processing said glass frit fusion seal at a temperature in the range from 405° C. to 440° C.

38. A method as claimed in claim 37, wherein attaching further comprises forming a glass frit fusion seal to fiber grating bond that has a pull strength in the range from about 1 to 3 lbs.

39. A method as claimed in claim 33, wherein attaching said fiber grating to said substrate with a lead zinc borate glass frit fusion seal includes processing said glass frit fusion seal at a temperature in the range from 410° C. to less than 430° C.

40. A method as claimed in claim 33, wherein attaching said fiber grating to said substrate with a lead zinc borate glass frit fusion seal includes processing said glass frit fusion seal at a temperature in the range from 420° C. to less than 430° C.

41. A method as claimed in claim 33, wherein attaching said fiber grating to said substrate with a lead zinc borate glass frit fusion seal includes heating said glass frit fusion seal at a temperature of about 425° C.

42. A method as claimed in 33, further comprising enclosing said attached fiber grating and said substrate and said glass frit fusion seal in a nonhermetic packaging container.

43. A method as claimed in 33, further comprising hermetically sealing said attached fiber grating and said substrate and said glass frit fusion seal within a hermetic packaging container.

44. A method of making an environmentally stable athermalized fiber grating waveguide device for use in an optical waveguide deployment environment, said method comprising: providing an optical fiber Bragg grating which reflects light centered about a wavelength $\lambda$, environmentally stabilizing a negative thermal expansion βeta-eucryptite glass-ceramic substrate by $H_2O$ treatment, attaching said optical fiber grating under tension to said environmentally stabilized glass-ceramic substrate wherein said substrate compensates for thermally induced wavelength shifts in said fiber grating and said wavelength $\lambda$ varies less than +/−0.010 nm when exposed to a humid environment which has a relative humidity of at least 80%.

45. A method as claimed in claim 44, wherein environmentally stabilizing said substrate comprises providing a dimensionally unstable substrate, submerging the provided substrate in a bath containing water, exposing said submerged substrate to a humid treatment atmosphere, and drying said exposed substrate prior to attaching.

46. A method as claimed in claim 44, wherein environmentally stabilizing said substrate comprises providing a dimensionally unstable microcracked substrate having a plurality of microcracks having lengths and crack tips, driving said microcracks so as to increase the length of said microcracks, and sealing the crack tips of said microcracks.

47. A method as claimed in 44, wherein exposing said submerged substrate to a humid treatment atmosphere comprises exposing said substrate to a humid atmosphere having a relative humidity of at least 80% and a temperature of at least 80° C.

48. A method as claimed in 44, further comprising enclosing said attached fiber grating and said substrate in a nonhermetic packaging container.

49. A method as claimed in 44, further comprising hermetically sealing said attached fiber grating and said substrate within a hermetic packaging container.

50. A method as claimed in claim 44, further comprising exposing said fiber grating attached to said substrate for at least 2000 hours to a humid environment which has a relative humidity of at least 95% and a temperature of about 25° C., and monitoring said wavelength $\lambda$.

51. A method as claimed in claim 44, wherein the step of attaching said optical fiber grating includes attaching said optical fiber grating to said glass-ceramic substrate with a lead zinc borate glass frit fusion seal at a temperature in the range from 410° C. to less than 430° C.

52. A method as claimed in claim 51, wherein attaching said fiber grating to said substrate with a lead zinc borate glass frit fusion seal includes heating said glass frit fusion seal to a temperature of about 425° C.

53. A method as claimed in claim 51, wherein attaching includes heating with a laser beam.

54. A method as claimed in claim 51, wherein attaching includes heating with a laser beam and monitoring the temperature of the heated glass frit fusion seal with an IR thermocouple.

55. A method as claimed in claim 51, wherein attaching further comprises forming a glass frit fusion seal to fiber grating bond that has a pull strength in the range from 1 to 3 lb.

56. A method as claimed in claim 51, further comprising enclosing said attached fiber grating and said substrate and said glass frit fusion seal in a nonhermetic packaging container.

57. A method as claimed in 57, further comprising hermetically sealing said attached fiber grating and said substrate and said glass frit fusion seal within a hermetic packaging container.

58. A method as claimed in claim 51, further comprising exposing said fiber grating attached to said substrate with said glass frit fusion seal for at least 2000 hours to a humid environment which has a relative humidity of at least 90% and a temperature of about 25° C. and monitoring said wavelength $\lambda$.

* * * * *